United States Patent
Katz et al.

(10) Patent No.: US 6,314,086 B1
(45) Date of Patent: Nov. 6, 2001

(54) INTERACTIVE CONTEXTUAL-BASED ASSISTANCE FOR PORTABLE ISDN TEST SET

(75) Inventors: Paul H. Katz, Westlake Village; Roy L. Soto, Moorpark; Linda L. Hathorn, Camarillo, all of CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 08/984,233

(22) Filed: Dec. 3, 1997

Related U.S. Application Data (63) Continuation-in-part of application No. 08/855,117, filed on May 13, 1997, now abandoned.

(51) Int. Cl.[7] .............................. G08C 15/00; H04J 3/12
(52) U.S. Cl. ........................ 370/241; 370/242; 379/21
(58) Field of Search .................................. 370/242, 247, 370/252, 522, 524, 241, 244; 379/21, 27, 29, 32

(56) References Cited

U.S. PATENT DOCUMENTS

| | | | |
|---|---|---|---|
| 4,105,995 | * 8/1978 | Bothof et al. ............... | 340/146.1 E |
| 4,922,516 | * 5/1990 | Butler et al. ............... | 379/21 |
| 5,121,420 | * 6/1992 | Marr et al. ............... | 379/26 |
| 5,521,958 | * 5/1996 | Selig et al. ............... | 379/21 |
| 5,703,929 | * 12/1997 | Schillaci et al. ............... | 379/21 |
| 5,764,726 | * 6/1998 | Selig et al. ............... | 379/21 |
| 5,784,558 | * 7/1998 | Emerson et al. ............... | 395/200.6 |
| 5,982,851 | * 11/1999 | Kennedy et al. ............... | 379/21 |

* cited by examiner

Primary Examiner—Dang Ton
Assistant Examiner—Toan Nguyen
(74) Attorney, Agent, or Firm—Allen, Dyer, Doppelt, Milbrath & Gilchrist, P.A.

(57) ABSTRACT

An integrated services digital network (ISDN) test set includes an ISDN transceiver, a supervisory control processor which is operative to cause the ISDN transceiver to controllably transmit and receive ISDN communication messages over a communication circuit, and an alphanumeric message display through which messages associated with the operation of the ISDN test set are displayed. The test set keypad also includes a dedicated 'ASSIST' key, that is selectably operated by the user, to cause the control processor to execute a user assistance routine, which accesses a contextual-based alpha-numeric database, whose contents are associated with and provide additional information of a displayed alpha-numeric message. This enables a test set user, regardless of training or experience, to be provided with information necessary to competently operate the test set and successfully test an ISDN line.

21 Claims, 7 Drawing Sheets

```
            ┌─────────────────────┐
            │ CALL: A SESS MP     │
    360 ─── │ SPID: 0173800410    │
            │ B1: VOICE           │
            │ CALL  SWITCH  SPID  │      FIG. 8
            └─────────────────────┘
```

UPON PRESSING ASSIST:

```
            ┌─────────────────────┐
            │ HOME SCREEN FOR CALL│
            │ SET UP AND CALL     │
            │ SELECTION.          │
            │         FWD   EXIT  │      FIG. 9
            └─────────────────────┘
```

UPON PRESSING F2 (FWD):

```
            ┌─────────────────────┐
            │ CALL KEY: SELECT CALL│
            │ A OR B, B CHAN, AND │
            │ BEARER SERVICE.     │
            │ BACK  FWD     EXIT  │      FIG. 10
            └─────────────────────┘
```

UPON PRESSING F2 (FWD) AGAIN:

```
            ┌─────────────────────┐
            │ SWITCH KEY: SELECT  │
            │ CENTRAL OFFICE      │
            │ SWITCH TYPE.        │
            │ BACK  FWD     EXIT  │      FIG. 11
            └─────────────────────┘
```

UPON PRESSING F2 (FWD) AGAIN:

```
            ┌─────────────────────┐
            │ SPID KEY: ENTER     │
            │ SPIDs, CALL APP.,   │
            │ VIEW OR SET TEIs.   │
            │ BACK  FWD     EXIT  │      FIG. 12
            └─────────────────────┘
```

UPON PRESSING F2 (FWD) AGAIN:

```
            ┌─────────────────────┐
            │ ASSIST KEY FOR INDEX│
            │                     │
            │                     │
            │ BACK          EXIT  │      FIG. 13
            └─────────────────────┘
```

PRESS A NUMBER TO
JUMP ALPHABETICALLY
OR SCROLL THRU LIST.
         FWD    EXIT

*FIG. 14*

UPON PRESSING THE F2 (FWD) KEY, OR JUMPING
USING THE NUMERIC KEYS:

ASSIST
PRESS * TO SEE TOPIC
OR NUMBER TO JUMP.
BACK   FWD     EXIT

*FIG. 15*

UPON PRESSING F2 (FWD):

BACKLIGHT
PRESS * TO SEE TOPIC
OR NUMBER TO JUMP.
BACK   FWD     EXIT

*FIG. 16*

UPON PRESSING F2 (FWD) AGAIN:

CALL A/B
PRESS * TO SEE TOPIC
OR NUMBER TO JUMP.
BACK   FWD     EXIT

*FIG. 17*

UPON PRESSING F2 (FWD) AGAIN:

VIEW
PRESS * TO SEE TOPIC
OR NUMBER TO JUMP.
BACK               EXIT

*FIG. 18*

```
[CAUSE #21
CALL REJECTED]
CLEARING CALL A...
CALL A CLEARED
```
*FIG. 19*

UPON PRESSING ASSIST, BITS II WILL DISPLAY:

```
CAUSE #21: CALL
REJECTED. THE CALLED
PARTY HAS REJECTED
           FWD    EXIT
```
*FIG. 20*

UPON PRESSING F2 (FWD):

```
THE CALL EITHER
EXPLICITLY OR
BECAUSE OF A BEARER
BACK   FWD    EXIT
```
*FIG. 21*

UPON PRESSING F2 (FWD) AGAIN:

```
SERVICE MISMATCH
(VOICE, DATA, ETC.),
OR THE NETWORK WILL
BACK   FWD    EXIT
```
*FIG. 22*

UPON PRESSING F2 (FWD) AGAIN:

```
NOT PERMIT THE CALL
BECAUSE OF THE
SELECTED BEARER
BACK   FWD    EXIT
```
*FIG. 23*

UPON PRESSING F2 (FWD) AGAIN:

```
SERVICE.
ASSIST KEY FOR INDEX

BACK          EXIT
```
*FIG. 24*

INTERACTIVE CONTEXTUAL-BASED ASSISTANCE FOR PORTABLE ISDN TEST SET

CROSS-REFERENCE TO RELATED APPLICATIONS

The present application is a continuation-in-part of U.S. patent application Ser. No. 08/855,117, filed May, 13, 1997 now abandoned, entitled: "Test Set Using ISDN Bearer Channel for Testing Telephone Line," by R. Soto et al (hereinafter referred to as the '117 application), assigned to the assignee of the present application, and the disclosure of which is herein incorporated.

The present application also relates to subject matter disclosed in the following U.S. patent applications, each of which is assigned to the assignee of the present application, and the disclosures of which are herein incorporated: Ser. No. 08/984,287 now U.S. Pat. No. 6,185,191, entitled "Testing of ISDN Line via Auxiliary Channel Signaling," by M. Dipperstein et al, Ser. No. 08/984,515 now abandoned, entitled "Automated Master-Slave Connectivity for Dry Loop ISDN Line," by R. Soto et al, Ser. No. 09/433,269 now U.S. Pat. No. 6,163,594, entitled "Call Yourself BERT Testing of ISDN Line," by M. Kennedy et al and Ser. No. 08,/984,284 now pending, entitled "*User Selectable Overlap and Enbloc Speed Dialing of ISDN Line," by P. Katz et al.

FIELD OF THE INVENTION

The present invention relates to telecommunication systems, and is particularly directed to a contextual-based assistance mechanism, that is incorporated within a craftsperson's ISDN test set having an architecture of the type described in the above-referenced '117 application, for facilitating the operation of the test set and thereby the testing and troubleshooting of an ISDN communication circuit.

BACKGROUND OF THE INVENTION

As described in the above-referenced '117 application, a variety of telecommunication test units have been proposed for testing various types of digital signalling circuits. Such circuits may include, but are not limited to, those transporting high bit rate digital subscriber line (HDSL) signals, asymmetric digital subscriber line (ADSL) signals, digital data service (DDS) signals and integrated services digital network (ISDN) signals. Unfortunately, such conventional test units are relatively cumbersome and hardware-intensive devices, typically resident in a telcom service office or other fixed system installation, that affords only a single point of access to the circuit of interest.

A non-limiting example of such a conventional test unit is described in the U.S. Pat. No. 5,208,846, to Hammond et al, entitled: "Subscriber Loop Tester for Telephone Switching Systems." In order to be connectable with various types of telecommunication circuits, the Hammond et al test unit contains different types of line interfaces/jacks. Determining which jack is to be used requires that the test system operator have a prior knowledge of the communication link to which the test set is to be coupled. Without this knowledge, the user does not know to which jack the line should be connected, and cannot readily configure the test unit to support a particular user interface and associated termination hardware.

As noted above, conventional test units are relatively large and fixed pieces of equipment, so that they are not readily suited for use in the field (i.e., they are not portable), so that they cannot be readily interfaced with any accessible location along a communication link. This relatively poor facility of transport and ready connection to any location along a link to be tested also limits the practicality and effectiveness of such test units.

These shortcomings have become a particular concern to telecommunication service providers, especially with the continuing expansion and demand for integrated services digital network (ISDN) services. Not only is there currently a need for a practical, portable test set that is capable of testing already installed ISDN circuits, but one which can perform 'dry loop' line testing, prior to its use for ISDN service; namely, there is a need for an ISDN test device that will permit a circuit to be 'prequalified' (as ISDN-capable), before ISDN equipment is purchased and connected to the line to be used for ISDN service.

Advantageously, the portable test set described in the above-referenced '117 application contains a communication architecture that is readily interfaced with virtually any location along a line/circuit to be tested, so as to allow testing of the line, irrespective of its configuration (e.g., two-wire vs. four-wire), or the type of signals that may be conveyed over the line (analog or digital). In addition to circuitry for testing the operation of a standard analog (POTS) line, the portable test set described in the '117 application contains a digital communications controller and associated digital signalling interface circuits, including both 'U' interface and 'S/T' interface circuits.

Thus, the test set can be interfaced with either a two-wire network link or a four-wire customer premises link, and may transmit and receive ISDN bearer channel messages over whatever line to which it is connected. The contents of such bearer channel messages may be defined to evoke prescribed responses from a companion test set coupled to another portion (relatively far end) of the communication circuit of interest, so that the line linking the two test sets may be tested. When two such test sets are interfaced with spaced apart locations of the circuit/line under test, they may operate in respective master and slave modes, allowing a craftsperson using the master test set to initiate a bit error rate test (BERT) from one end of the circuit, and derive a measure of the operational performance characteristic of the in-between segment of the circuit.

SUMMARY OF THE INVENTION

The present invention is directed to an enhancement of the ISDN communication and testing functionality of the test set described in the '117 application, that is not only capable of performing line prequalification and post installation testing, but does so in a manner that simplifies the interaction between the user/craftsperson and the test set, thereby minimizing line testing inaccuracies (which often depend upon the skill and familiarity of the technician with ISDN communications) and improving performance.

In particular, the present invention is directed to a contextual-based assistance enhancement to the operational control software that is executed by the test set's supervisory processor, and which is accessed by the operation of an ASSIST key on the test set keypad. When this interactive user-assistance program is so accessed, it causes a test set user interface, such as a display panel, to generate one or more alpha-numeric messages, through which a craftsperson, regardless of training or experience, is provided with information necessary to competently operate the test set and successfully test an ISDN line.

The contextual-based assistance mechanism of the invention comprises a referential help database of alpha numeric terms/topics and their functional descriptions, which may be either associated with the architecture and operation of the test set, or associated with conditions that may be encountered by the craftsperson when using the test set to troubleshoot or test an ISDN line. This provides access to a library of terms/topics and their associated definitions, which may be employed as a tutorial guide in the course of troubleshooting a line. Auspiciously, operation of the ASSIST key when the test set's display screen contains a message that has been transmitted to the test set from another piece of telecommunication equipment, such as a central office switch, in association with the progress of a call/test, will cause the display of a clarifying definition of the message.

This clarifying message display not only serves to educate the user as to what the message means, but provides a guide to expediting the current operational use of the test set for the call or test, which caused the remotely sourced message. Namely, for any state of the test set, depressing the ASSIST key, one time, causes the execution of a contextual-based assistance routine that is operative to search, retrieve and output (e.g., display) additional explanatory information, associated with the alpha-numeric contents of whatever is currently supplied by way of a test set user interface (display screen). Depressing the ASSIST key a second time calls up a referential help database search subroutine.

When the referential help database search subroutine is called up, it causes the generation of an informational message that instructs the user to either begin scrolling through an alphabetized listing of topic/term definitions, or to press one of the alpha numeric keys on the keypad, that contains the letter which begins with the topic or term of interest. In response to the operation of a selected alphanumeric key on the keypad 300 one or more times (to step through the letters for that key), a first alphabetical listing in a group of terms, each of which begins with the selected letter, is supplied. In addition, the user is instructed to depress a prescribed key (e.g., the "*" key) to view a definition of the term.

DETAILED DESCRIPTION

Before describing in detail the new and improved contextual-based assistance mechanism of the present invention, it should be observed that the invention resides primarily in what is effectively an augmentation of the operational control software executed by the supervisory microcontroller of the test set of the '117 application. The circuitry of the test set is otherwise essentially unaffected. Consequently, the architecture of the test set per se, and the manner in which it is interfaced with communication equipment of a telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figure 1:
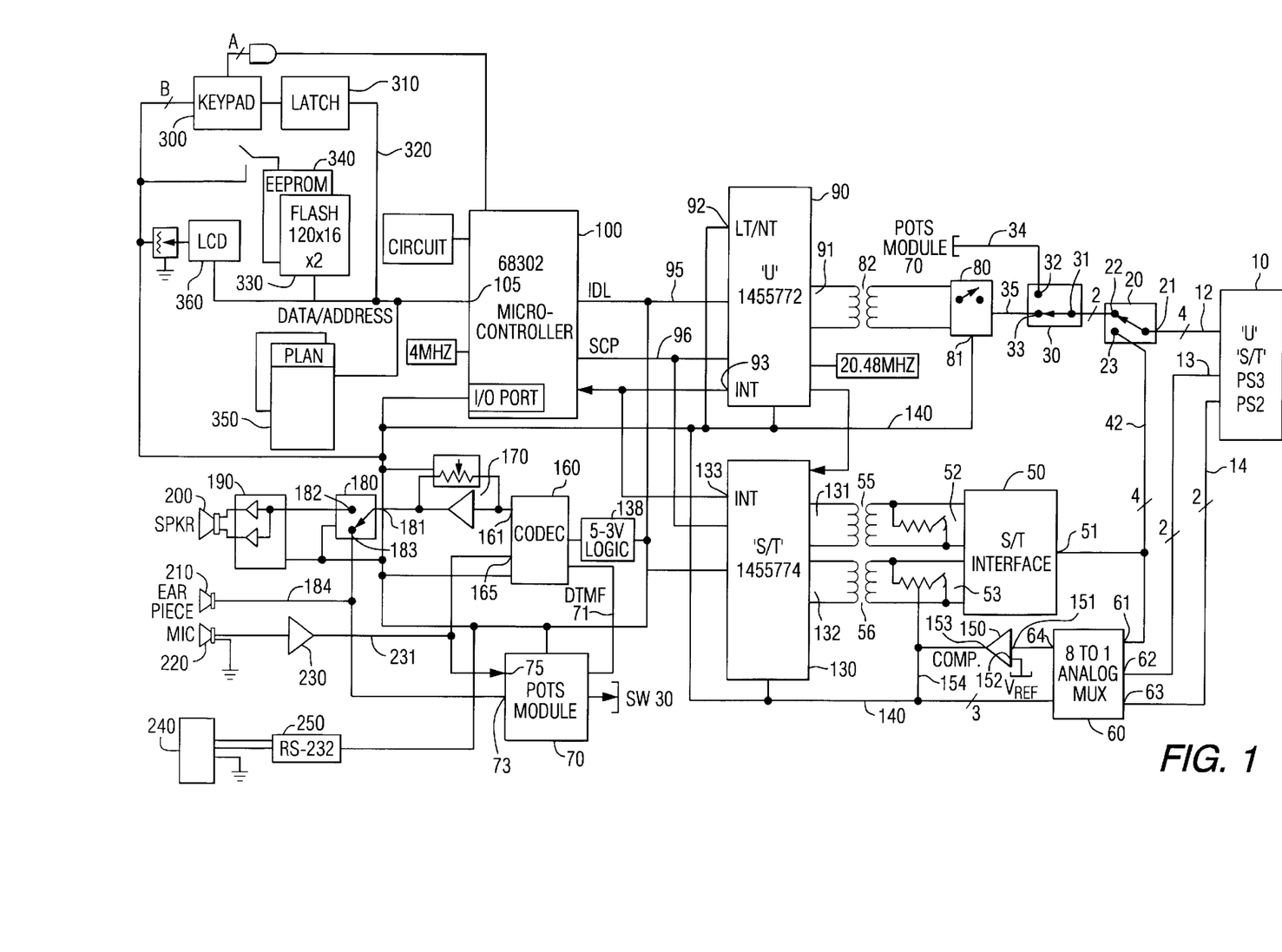
FIG. 1 diagrammatically illustrates the architecture of the ISDN test set architecture described in the '117 application.
Figure 2:
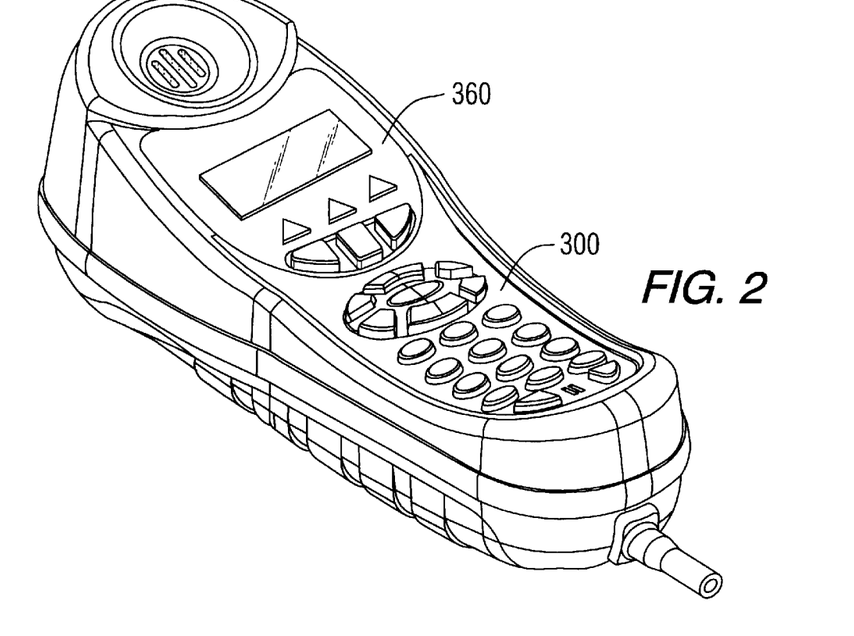
FIGS. 2 and 3 are respective front and rear isometric pictorial views of a housing configuration for the ISDN test set of FIG. 1.
Figure 3:
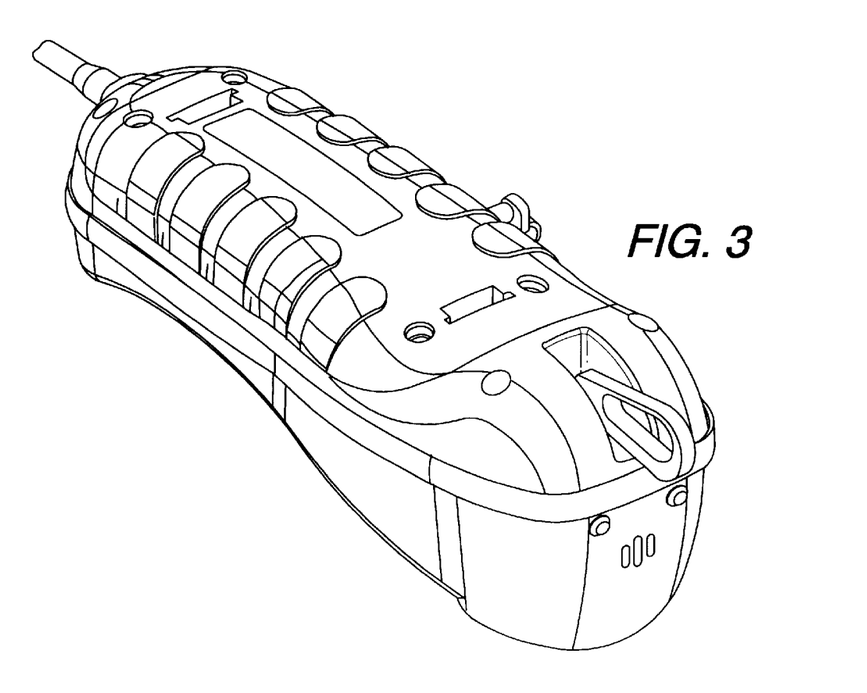

The overall communication and signal processing circuit architecture of a test set of the type described in the '117 application, in which the communication and testing control mechanism of the present invention may be readily incorporated, is diagrammatically illustrated in FIG. 1. To facilitate portability and ruggedized field use, the test set's circuit architecture is preferably housed within a robust protective casing physically configured as diagrammatically illustrated in the isometric pictorial views of FIGS. 2 and 3, and disclosed in detail in the following co-pending U.S. Patent applications: Design Ser. No. 29/061,617, now U.S. Pat. No. D400,875 entitled: "ISDN Test Set," by R. Soto et al, filed Oct. 28, 1996, which is a continuation-in-part of U.S Design Ser. No. 29/053,246, entitled: "ISDN Test Set," by R. Soto et al, filed Apr. 18, 1996 now abandoned; and Utility Applications: Ser. No. 08/754,077, filed Nov. 20, 1996, now U.S. Pat. No. 5,768,369 entitled "Telephone Test Set Keypad with Integrated Dynamic Microphone," by E. Zoiss et al; Ser. No. 08/753,101, filed Nov. 20, 1996, entitled "Telephone Test Set LCD Panel Carrier," by E. Zoiss et al; Ser. No. 08/754,075, filed Nov. 20, 1996, now U.S. Pat. No. 5,841,857 entitled "Line Cord Strain Relief Attachment for Telephone Test Set," by E. Zoiss et al; and Ser. No. 08/754,076, filed Nov. 20, 1996, now U.S. Pat. No. 5,872,831 entitled "Variable Geometry Battery Compartment for Accommodating Different Sized Batteries in Telephone Craftsperson's Test Set," by E. Zoiss et al. Each of the above applications is assigned to the assignee of the present application, and their disclosures are herein incorporated.

Referring now to FIG. 1, the communication and signal processing circuit architecture of the test set described in the '117 application is diagrammatically illustrated as comprising a multi-pin modular jack 10, engagable by a multi-pin conductor plug terminating one end of a multi-conductor line cord, through which the test set is connectable with a circuit under test. The respective pins of the modular jack 10 are connected via multi-conductor links 11, 12 and 13, to the internal circuitry of the test set.

For this purpose, a first four-pin link 11, two leads of which are respectively associated with tip and ring lead conductors of multi-pin jack 10, is coupled to a four-pin common port 21 of a first switch 20. A first, two-pin switch port 22 of switch 20 is coupled to a two-pin common port 31 of a second switch 30. A second, four-pin switch port 23 of first switch 20 is coupled to a four conductor link 42 to a four-pin port 51 of a transformer interface 50 and to a four pin input port 61 of an 8:1 analog multiplexer 60. Two-pin links 12 and 13 are coupled from modular jack 10 to respective two pin in ports 62 and 63 of 8:1 analog multiplexer 60.

The 8:1 analog multiplexer 60 has an output port 64 coupled to a first input 151 of a voltage threshold comparator 150. Voltage threshold comparator has a second input 162 coupled to receive a prescribed reference voltage $V_{REF}$. The output 153 of comparator is coupled to an input/output (I/O)—control bus 140 associated with the test set's supervisory microcontroller 100. The multiplexer 60 has a multibit steering control input 65 coupled to control bus 140, for selecting which of the respective portions of multiconductor links 42, 13 and 14 is coupled to comparator 150. Should the line voltage of the selected lead exceed the threshold reference voltage $V_{REF}$, the voltage comparator 150 provides an output on a voltage detect line portion 154 of the I/O control bus 140, which is read by the micro-controller 100. The states of the respective sets of leads 11–13 are mapped by an internal truth table used by the microcontroller 100 to identify the type of line to which the test set is connected.

A first, two pin port 32 of the switch 30 is coupled via link 34 to a POTS line interface module 70. Module 70 module contains conventional dial tone detector and DTMF signalling circuitry, and is employed for conducting voice communications, DTMF and dial pulse signalling on a POTS line. A second two pin switch port 33 of switch 30 is coupled via link 35 to a controlled attenuator 80. Attenuator 80 has a control port 81 coupled to the control bus 140, and is transformer-coupled, by way of transformer circuit 82, to a two wire port 91 of standard (two wire) 'U' interface chip 90, used for standard 2B1Q signalling.

The 'U' interface chip 90, which is coupled to and controlled by microcontroller 100, is selectively controlled via a control port 92 to function as either a line termination (LT) or a network termination (NT). As will be described, when either bit error rate testing (BERT) of the line, or dry-loop communications are to be carried out over the line under test, the 'U' interface chip 90 is selectively placed in LT mode. A port 93 provides an interrupt link to the microcontroller 100. Digital data. communications between the two-wire 'U' interface chip 90 and the microcontroller 100 are effected by way of a first (IDL) digital serial bus digital 95 and a second (SCP) digital serial bus 96.

The four-wire transformer interface 50, to the four pin port 51 of which the four lead conductor link 42 is coupled from port 23 of switch 20, has respective pairs of two wire links 52 and 53 transformer-coupled, via transformer pairs 55 and 56, to respective two wire ports 131 and 132 of a (four wire) 'S/T' interface chip 130. Respective controlled attenuators 57 and 58 are coupled across links 52 and 53, and are controlled by way of control bus 140. Like the 'U' interface chip 90, the 'S/T' interface chip 130 is coupled to microcontroller 100 by way of the first digital link IDL 95 and the second digital link SCP 96. In addition, it has an interrupt port 133 for providing an interrupt signal to the microcontroller 100.

The first (IDL) digital serial bus 95 is further coupled through a (5V–3V) logic level translation circuit 138 to a CODEC 160. CODEC 160 is coupled via a DTMF link 71 to POTS line interface module 70. The CODEC 160 has a first output port 161 coupled through a controlled gain amplifier 170 to a common/input terminal 181 of a switch 180. Switch 180 has a first output terminal 182 coupled to a speaker amplifier 190, the output of which is coupled to an audio speaker 200. Switch 180 has a second output terminal 183 coupled to link 184 which is coupled to of POTS line interface module 70. Link 184 is further coupled to an earpiece receiver transducer 210 of the test set. A microphone (MIC) 220 is coupled to an amplifier 230, the output of which is coupled via link 231 to port 165 of CODEC 160 and to an audio input port 75 of POTS line interface module 70.

An auxiliary digital (RS 232) I/O port is provided by way of a multipin connector 240, such as an RJ-45 jack. This connector is coupled to an RS-232 transceiver 250, which may be used to monitor externally provided bearer (B) channel information or to download communication control software into the microcontroller 100. The RS-232 transceiver 250 is, in turn, ported to I/O-control bus 140.

User/craftsperson inputs for controlling operation of the test set are effected by means of a standard multi-key keypad 300, to which I/O-control bus 140 is coupled. Key depression of the keys of the keypad 300 generate input commands that are buffered in a latch 310, the contents of which are asserted onto a distributed multibit data/address bus 320. Data/address bus 320 is ported to a data/address port 105 of the microcontroller 100. Microcontroller 100 has a limited storage capacity flash memory 330, an EPROM 340 in which the operational software for the microcontroller is stored, and a random access memory 350 for storing data processed by the microcontroller's central processing unit (CPU).

The data/address bus 320 is also ported to an LCD unit 360, which provides an alpha-numeric visual display of a menu of options/actions that may be selectively invoked by keypad inputs from the user, and an indication of the operation of the test set, as microcontroller 100 sequences through stored test routines, to be described. In addition to the LCD unit 360, the test set may employ one or more discrete visual indicators, such as a set of LEDs that are coupled to I/O bus 140, and selectively individually energized by the microcontroller 100 to provide an indication of prescribed status or operational conditions of the line under test such as, but not limited to, ON /OFF hook, tip/ring polarity and test set battery charging status.

As described in the above-referenced '117 application, the test set architecture of FIG. 1 is able to conduct a number of analog and digital test operations of a line to it is connected. These test operations include an initial mode termed "LINE IDENTIFICATION MODE" (in which the type of line to which the test set is connected is automatically determined), and "POTS MODE," (for testing a POTS line, in which the tip and ring line portions of the four-wire link 12 are coupled through switches 20 and 30 to the POTS line interface module 70).

In addition, because the test set architecture of FIG. 1 includes both two-wire 'U' interface chip 90 and four-wire 'S/T' interface chip 130, the test set may be used to troubleshoot a potentially faulty digital (e.g., ISDN) circuit that is either upstream (toward the central office), or downstream (toward a remote terminal-customer premises equipment) of the location at which the craftsperson has connected the test set. Where two test sets of the type shown in FIG. 1 are available, the potentially faulty circuit of interest may be tested by placing the test sets in a master-slave mode of operation. The 'master' test set may be connected to a first, test supervisory location of the line, from which the test is to be conducted (such as at a central office line termination location). The 'slave' test set may be connected to a second site of the line, geographically remote from the first site (such as at a network termination of a customer premises). Once a loopback path has been established between the two test sets, a BER test may be initiated from the master test set.

In addition to loopback (for bit error rate testing), an echo-back mode of operation may also be used. This mode is somewhat similar to the loopback mode in that it's purpose is to have the slave test set send back to the master test set the contents of a prescribed data sequence. In echo-back mode, however, rather than the slave test set simply operating as a passive loopback device, the slave test set captures and then retransmits data placed on the D channel by the master test set.

Figure 4:
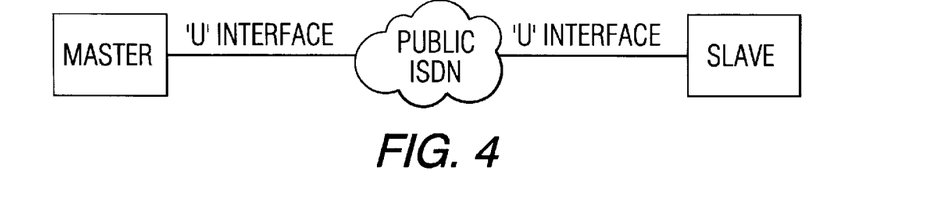
FIG. 4 diagrammatically illustrates a public switched telephone network at opposite ends of which respective master and slave ISDN test sets may be connected.
Figure 5:
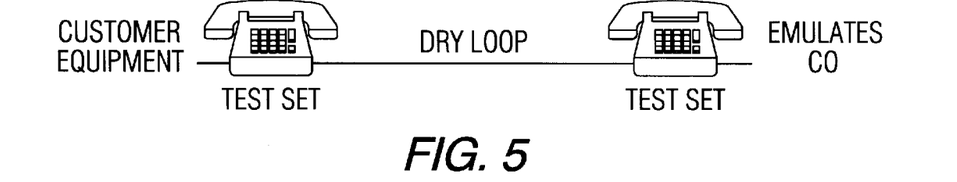
FIG. 5 diagrammatically illustrates a dry loop ISDN circuit having opposite ends. connected to respective master and slave ISDN test sets.

A voice link may be also established either over a public switched network, as diagrammatically illustrated in FIG. 4, or between two test sets that are connected to opposite ends of a non-powered or 'dry loop' link, as diagrammatically illustrated in FIG. 5, with one of the test sets operating in LT mode as a line termination device, and the other operating in NT mode as a network termination device. Also described in the '117 application is a callback mode of operation, which allows an unmanned slave test set to return a voice call (i.e., without the participation of an attendant craftsperson), and thereby determine whether a voice call can be established over the circuit under test.

CONTEXTUAL-BASED ASSISTANCE
(FIGS. 6–24)

As described above, the present invention is directed to an enhancement to the operational control software that is executed by the test set's supervisory processor for controlling the communication and testing functionality of the test set, including that described in the '117 application. In accordance with the invention, the operational control software of the test set incorporates a contextual-based assistance mechanism, which is accessed by the operation of an ASSIST key on the test set keypad. The ASSIST key is diagrammatically shown at 311 in the pictorial illustration of the test set keypad 300 FIG. 6.

Figure 6:
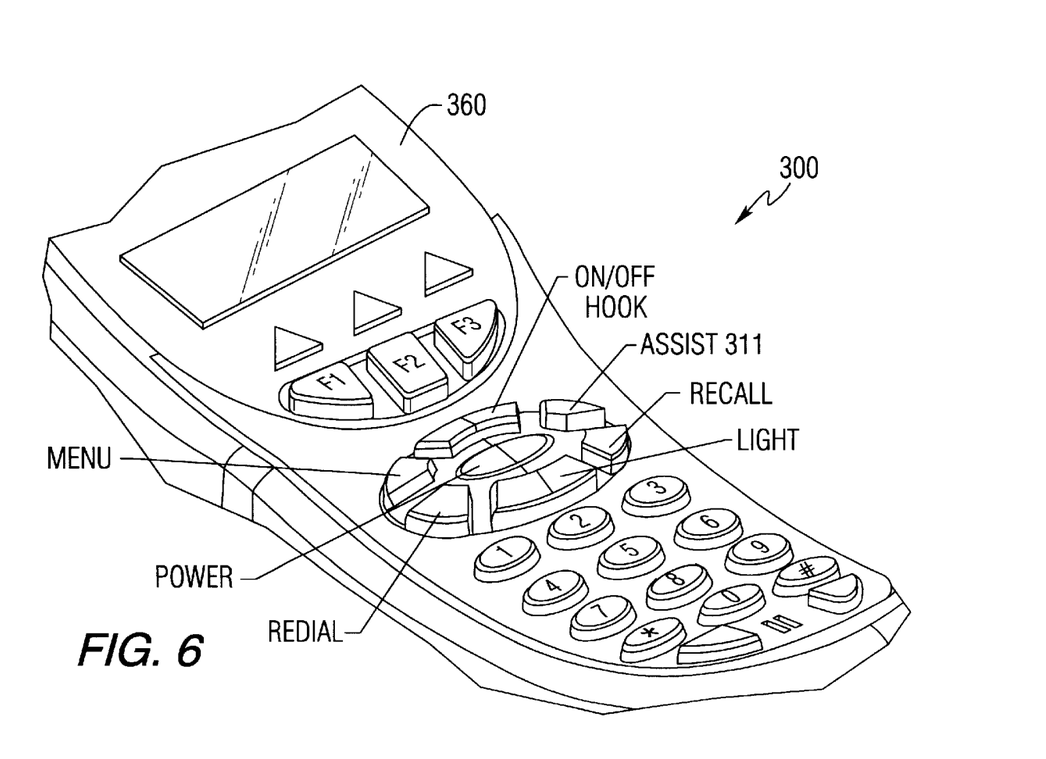
FIG. 6 is a pictorial illustration of the test set keypad.

When the interactive user-assistance program is so accessed, it causes a test set user interface, such as the test set display panel 360, to generate an alpha-numeric message, through which a craftsperson, regardless of training or experience, receives information necessary to competently operate the test set and successfully test an ISDN line. Although the test set display panel is a preferred form of user interface, it should be understood that the invention is not limited to use with this or any other form of user interface. Alternatively, other types of alpha-numeric information output devices, such as audio units, printers, etc., that are functionally equivalent to a display may be used.

The contextual-based assistance mechanism of the invention comprises a referential help database of alpha numeric terms/topics and their functional descriptions, which may be either associated with the architecture and operation of the test set, or associated with conditions that may be encountered by the craftsperson when using the test set to troubleshoot or test an ISDN line.

On the one hand, this provides access to a library of terms/topics and their associated definitions, which may be employed as a tutorial guide in the course of testing or troubleshooting a line, (similar to operation of a soft HELP button for a conventional graphics-based user interface of a personal computer). On the other hand, and of particular benefit, is the fact that operation of the ASSIST key, when the display screen contains a (usually abbreviated and somewhat cryptic) message that has been transmitted to the test set from another piece of telecommunication equipment (e.g., from a central office switch) in association with the progress of a call/test, will cause the display of a clarifying definition of that message.

This clarifying message display not only serves to educate the user as to what the message means, but gives a guide to expediting the current operational use of the test set for the call or line test, which gave rise to the remotely sourced message in the first place. Namely, regardless of the mode of operation or state of the test set, depressing the ASSIST key, one time, causes the execution of a contextual-based assistance routine that is operative to search, retrieve and display additional explanatory information, associated with the alpha-numeric contents of whatever is currently displayed on the test set's display screen.

Depressing the ASSIST key a second time calls up a referential help database search subroutine. When the referential help database search subroutine is called up, it causes the display of an information al message that instructs the user to either begin scrolling through an alphabetized listing of topic/term definitions, or to press one of the alpha numeric keys on the keypad, that contains the letter which begins with the topic or term of interest. In response to the operation of a selected alpha-numeric key on the keypad 300 one or more times (to step through the letters for that key), a first alphabetical listing in a group of terms, each of which begins with the selected letter, is displayed. In addition, the user is instructed to depress a prescribed key (e.g., the "*" key) to view a definition of the term.

Figure 7:
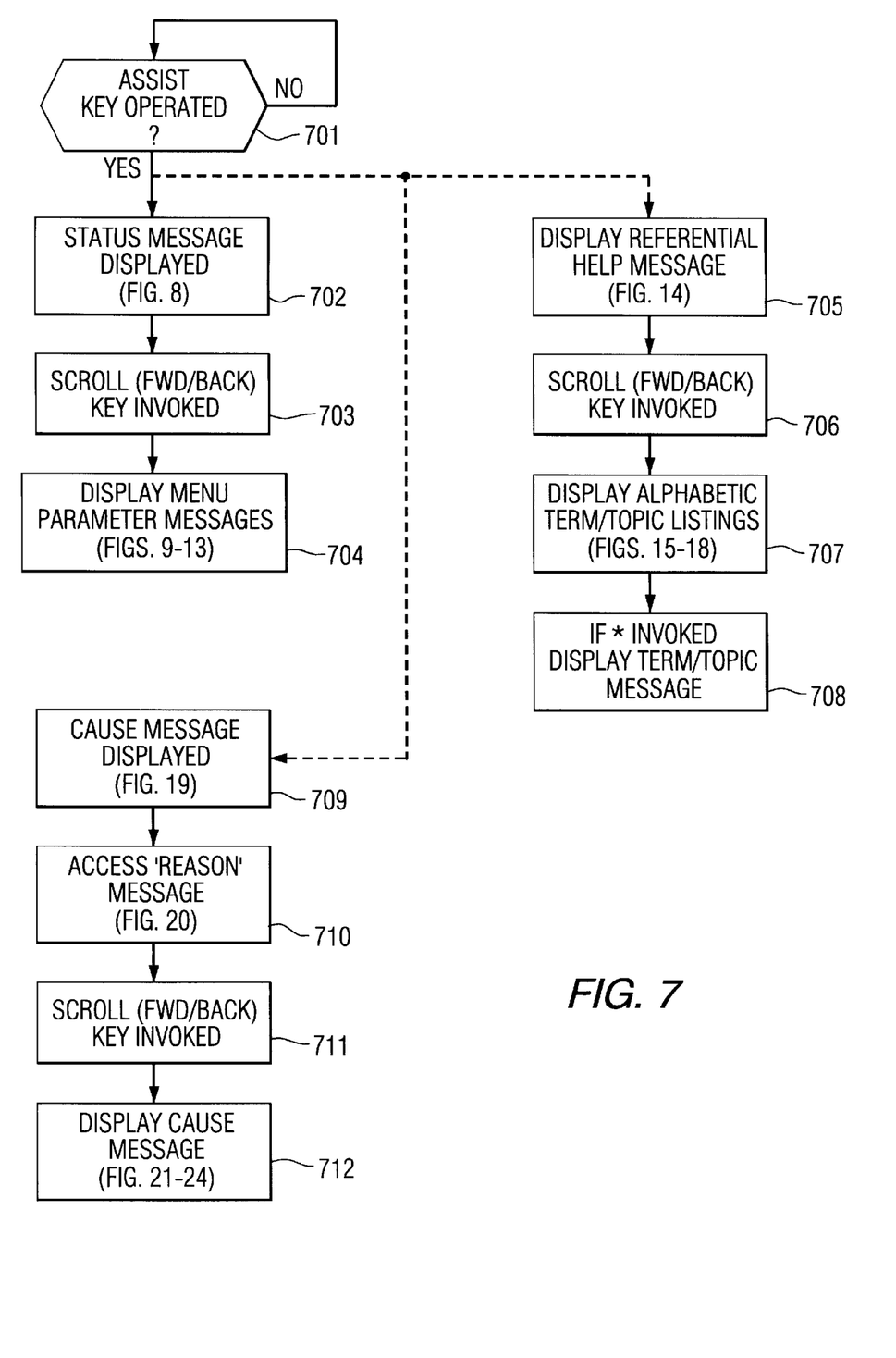
FIG. 7 is a flow chart of the contextual-based user assistance routine of the present invention.

ASSIST ROUTINE (FIG. 7)

More particularly, pursuant to the invention, whenever access to the (tutorial) database is desired, all that is necessary is for the user to operate the ASSIST key 311 on the test set keypad 300, as shown at step 701 of the flow chart in FIG. 7. In order to expedite a solution to whatever problem is currently being encountered by the user, in step 702, the database access routine initially generates a definitional 'status' message that briefly explains what is currently being displayed on the test set's display 360.

Figure 8:
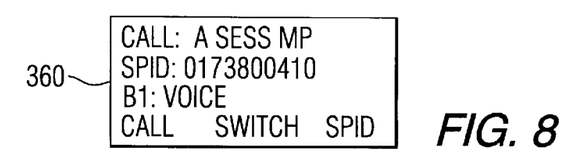
FIG. 8 shows an example of a 'home' screen message that may be displayed by the display panel of the ISDN test set of FIG. 1.

HOME SCREEN MESSAGE (FIG. 8)

This is pictorially illustrated in FIG. 8, for the non-limiting example of a 'home' screen message 801, where the test set is being initially configured to test an ISDN line. For this and other messages, the message display screen 360 will typically provide one or more soft key (in bold) options associated with terms of the message. For the non-limiting example of an ISDN call set up message of FIG. 8, three parameter soft keys: "Call," "Switch" and "SPID" are displayed.

EXPLANATORY CONTEXTUAL HELP MESSAGES (FIGS. 9–13)

Figure 9:
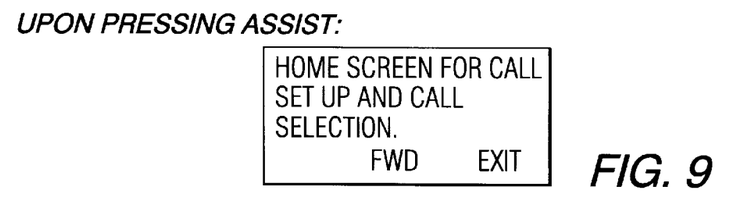
FIGS. 9–13 show examples of explanatory contextual help messages that may be displayed by the display panel of the ISDN test set of FIG. 1.
Figure 10:
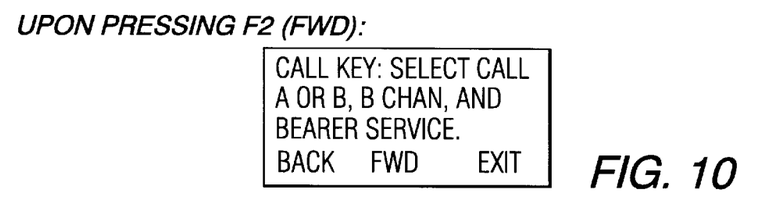
Figure 11:
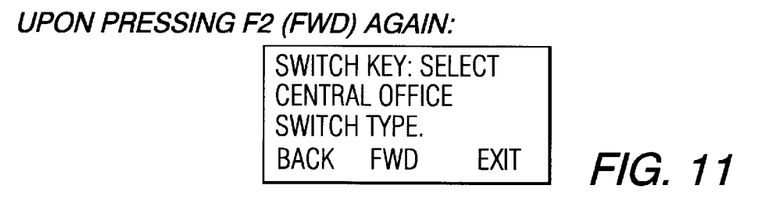
Figure 12:
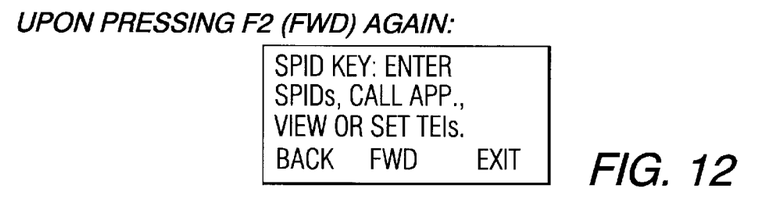

If the ASSIST key 311 is initially operated by the user during the display of a home screen message (that of FIG. 8 in the present example), the contextual-based access routine of the invention will generate a definition message, shown in FIG. 9, explaining that the displayed screen message is such a 'home' screen which, in the present example includes call set up and selection parameters. As further shown in each of FIGS. 9–13, an ASSIST key-invoked explanation message will also contain one or both of a pair of menu scrolling choices: "Back" and "Fwd," as well as an "Exit" choice to terminate the ASSIST routine.

As shown at step 703 of the flow chart of FIG. 7, the user may use a scroll control key (e.g., a FWD key) to step through the parameters of the home screen. With each operation of the scroll control key, a definition of the next respective parameter listed in the home screen is displayed, as shown at step 704, with successive screens of FIGS. 10–12, associated with the user sequencing (and calling up) through tutorial explanations for the three respective parameter soft keys: "Call," "Switch" and "SPID." When the user has completed scrolling through all of the parameters listed in the home screen, then the referential help routine will cause the generation of a message instructing the user to operate the ASSIST key again, in order to bring up the referential help database, as shown in the screen message of FIG. 13.

REFERENTIAL HELP MESSAGES (FIGS. 14–18)

Figure 13:
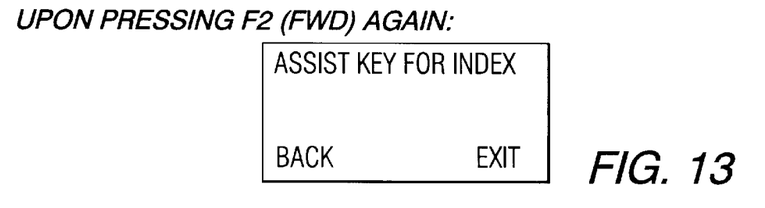
Figure 14:
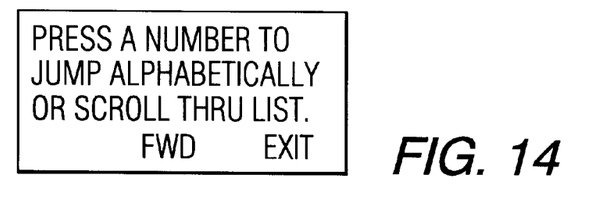
FIGS. 14–18 show examples of referential help i.messages that may be displayed by the display panel of the ISDN test set of FIG. 1.
Figure 15:
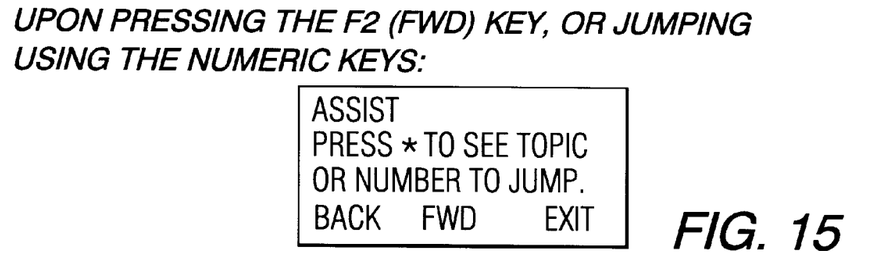
Figure 16:
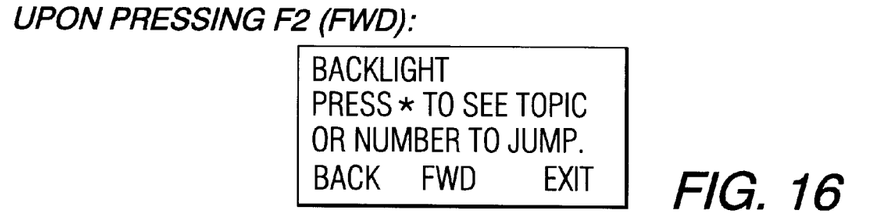
Figure 17:
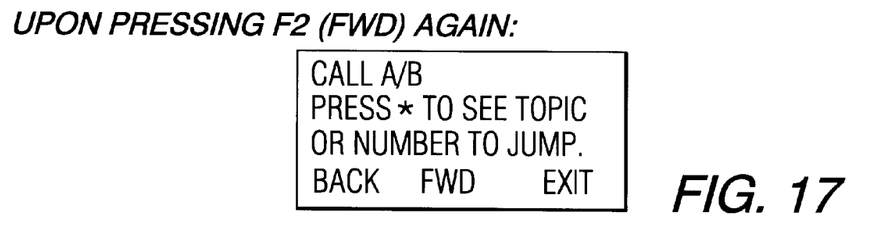
Figure 18:
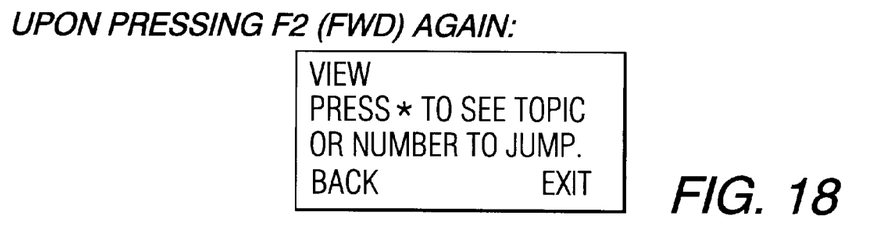

As pointed out above, whenever the ASSIST key is operated to access the referential help database (either directly, as would be the case in response to the current message shown in FIG. 13), or during an operational condition of the test set), the contextual-based user assistance routine of FIG. 7 displays an informational message instructing the user to either begin scrolling through an alphabetized listing of topic/term definitions, or to press one of the alpha numeric keys on the keypad that contains the letter which begins with the topic or term of interest. This is shown at step 705 in the flow chart of FIG. 7, and illustrated in the screen message of FIG. 14.

In response to the operation of a selected alpha-numeric key one or more times (to step through the letters for that key) in step 706, the first alphabetical listing in a group of terms, each of which begins with the selected letter, is displayed, as shown at step 707, and the successive initial alphabetically successive (A–B–C . . . V) term/topic listing screen messages shown in FIGS. 15–18. In addition, in the screen message displayed for each alphabetical term/topic listing, the user is instructed to depress a prescribed key (e.g., the "*" key), in response to which the routine will display a definition of the term, as shown at step 708.

CONTEXTUAL HELP—CAUSE MESSAGES (FIGS. 19–24)

As pointed out above, if the test set is already online and is being used to place a call or test a line, it can be expected to receive one or more messages from another piece of equipment (e.g., from a central office switch) in association with the progress of the call/test. For example, when a call is terminated, the (central office) switch will customarily transmit a relatively terse (CCITT-standards) 'cause' message representative of the reason for the termination of the call, but otherwise providing no explanation.

Figure 19:
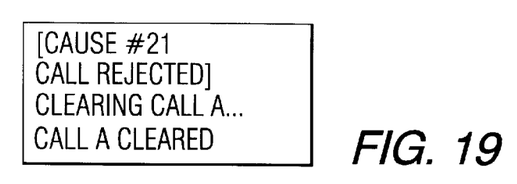
FIGS. 19–24 show examples of contextual help—cause messages that may be displayed by the display panel of the ISDN test set of FIG. 1.
Figure 20:
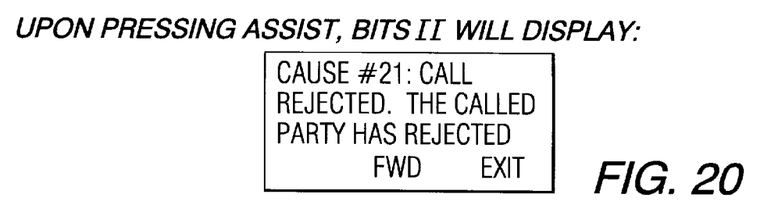
Figure 21:
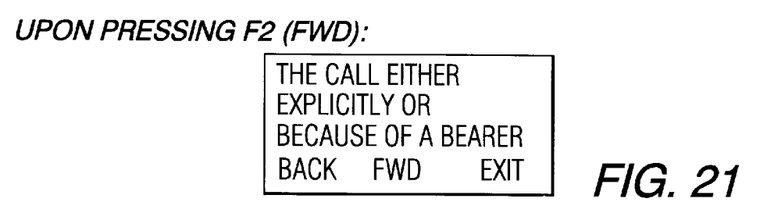
Figure 22:
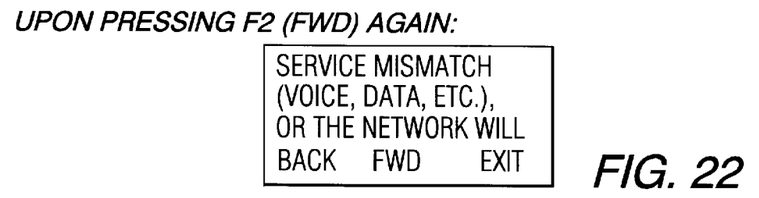
Figure 23:
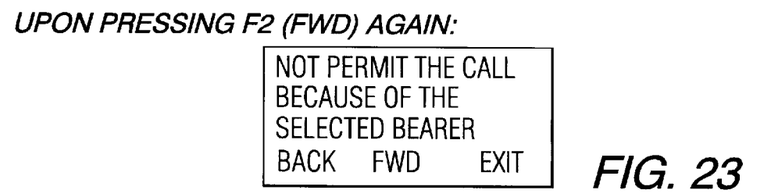
Figure 24:
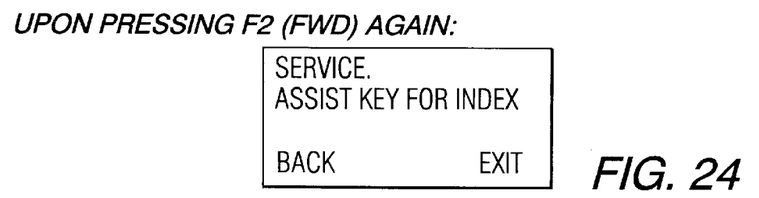

A non-limiting example of such a message (displayed in step 709 of FIG. 7) is illustrated in FIG. 19, as a "Cause #21 Call Rejected," and stating that Call A is being cleared. As pointed out above, the database employed by the contextual-based assistance routine of the invention not only includes an explanation of various terms and topics, but also operational messages, including, but not limited to CCITT 'cause' messages, that may be received during use of the test set. Pursuant to a further feature of the invention, operating the ASSIST key during the display of such an operational message will cause the contextual-based routine to access an explanatory 'reason' message, as shown at step 710.

As shown in the display screen sequence of FIGS. 20–24, this accessed message contains both a detailed explanation of the operational (e.g., cause) message, and a description of why the operational message was generated. As further indicated by the press forward (FWD) statements of FIGS. 20–23, the craftsperson may use the scroll control key (FWD) to scroll through successive lines of the 'reason' message, as shown at steps 711–712. When the user has completed scrolling through all of the lines of the reason message, then, in the last message, shown in FIG. 24, the routine will instruct the user to again operate the ASSIST key, if it is desired to bring up the referential help database, described above with reference to FIGS. 14–18.

As will be appreciated from the foregoing description, the contextual-based assistance mechanism of the present invention, which is readily accessed by the operation of an ASSIST key on the test set keypad dedicated for the purpose, is operative to cause the test set's display panel to generate an alpha-numeric user interface, through which a craftsperson, regardless of training or experience, may gain access to information necessary to competently operate the test set and successfully test an ISDN line. Advantageously, this information is stored as a referential help database of alpha numeric terms/topics and their functional descriptions, which may be either associated with the architecture and operation of the test set, or associated with conditions that may be encountered by the craftsperson when using the test set to troubleshoot or test an ISDN line.

This not only provides a library of terms/topics and their associated definitions, which may be employed as a tutorial guide in the course of testing or troubleshooting a line, but facilitates troubleshooting, simply by operating the ASSIST key, when the display screen contains a (CCITT cause) message that has been transmitted to the test set from telecommunication equipment in association with the progress of a call/test, so as to cause the display of a clarifying definition of that message. This clarifying message display both educates the user as to what the message means, and provides a guide to expediting the operational use of the test set for the call or test, which gave rise to the remotely sourced message.

Thus, irrespective of the mode of operation of the test set, depressing the ASSIST key, one time, causes the execution of a contextual-based assistance routine that is operative to search, retrieve and display additional explanatory information, associated whatever is currently displayed on the test set's display screen. Depressing the ASSIST key a second time calls up the referential help database search subroutine, which displays an informational message instructing the user to either begin scrolling through an alphabetized listing of topic/term definitions, or to press one of the alpha numeric keys on the keypad, that contains the letter which begins with the topic or term of interest.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with an ISDN test set, through which a user may test and communicate over an ISDN communication circuit, and having a test set user interface through which alpha-numeric messages associated with the operation of said ISDN test set are presentable to said user, a method of supplying informational messages to said user in the course of use of said ISDN test set comprising the steps of:

(a) storing within said test set a contextual-based alpha-numeric database, contents of which are associated with and provide additional information of said alpha-numeric messages that are presentable by said test set user interface;

(b) providing an input/output element that is selectably operated by said user; and (c) in response to operation of said input/output element by said user, causing said test set user interface to present an alpha-numeric informational message derived from said contents of said contextual-based database, in accordance with a contextual content of an alpha-numeric messages presented by said test set user interface, and wherein in response to operation of said input/output element, when said test set user interface generates a message transmitted to said test set from telecommunication equipment in association with the use of said test set, causing said test set user interface to generate a detailed explanation of said message, and in response to a second operation of said input/output element, implementing a referential help database search subroutine.

2. A method according to claim 1, wherein said test set user interface comprises a test set display element that is operative to display alpha-numeric messages associated with the operation of said test set.

3. A method according to claim 1, wherein said input/output element comprises a manually operable switching element provided at a keypad region of said test set.

4. A method according to claim 1, wherein said contextual-based alpha-numeric database includes a referential help database of alpha numeric terms/topics and their functional descriptions, that are associated with one or more of the architecture and operation of said test set, and conditions that may be encountered by said user when using the test set to test or communicate over said ISDN communication circuit.

5. A method according to claim 1, wherein step (c) comprises, in response to operation of said input/output element when said test set user interface generates a 'cause' message, transmitted to said test set from telecommunication equipment in association with the termination of a call, causing said test set user interface to present an explanation of said 'cause' message.

6. A method according to claim 1, wherein step (c) comprises, in response to a first operation of said input/output element, when said test set user interface presents a message transmitted to the test set from telecommunication equipment in association with use of said test set, causing the execution of a contextual-based assistance routine that is operative to output additional explanatory information, associated with the alpha-numeric contents of whatever is currently presented by way of said test set user interface.

7. A method according to claim 1, wherein step (c) further comprises, in response to an additional operation of said input/output element, causing said test set user interface to present an alpha-numeric message for accessing a referential help database of alpha numeric terms/topics and their functional descriptions, that are associated with one or more of the architecture and operation of said test set, and conditions that may be encountered by said user when using the test set to test or communicate over said ISDN communication circuit.

8. A method according to claim 1, wherein step (c) further comprises causing said test set user interface to present an informational message that instructs the user to either begin scrolling through an alphabetized listing of topic/term definitions, or to press one of the alpha numeric keys on a test set keypad, that contains the letter which begins with the topic or term of interest.

9. A method according to claim 1, wherein step (c) further comprises, in response to the operation of a selected alpha-numeric key on said test set keypad one or more times, causing said test set user interface to present a first alphabetical listing in a group of terms, each of which begins with a selected letter.

10. A method according to claim 1, wherein step (c) further comprises causing said test set user interface to present a message instructing the user to depress a prescribed keypad to view a definition of a currently presented term.

11. An integrated services digital network (ISDN) telecommunications device comprising an ISDN transceiver, and a supervisory control processor which is operative to cause said ISDN transceiver, when coupled to a communication circuit, to controllably transmit and receive ISDN communication messages over said communication circuit, and having a user interface through which alpha-numeric messages associated with the operation of said ISDN test set are presentable to said user, an input/output element that is selectably operated by said user, and a contextual-based alpha-numeric database, contents of which are associated with and provide additional information of said alpha-numeric messages that are presentable by said test set user interface, and wherein said supervisory control processor is operative, in response to operation of said input/output element by said user, to cause said test set user interface to present an alpha-numeric informational message derived from said contents of said contextual-based database, in accordance with contextual content of an alpha-numeric messages presented by said test set user interface, wherein said supervisory control processor is operative, in response to operation of said input/output element, when said test set user interface generates a message transmitted to said test set from telecommunication equipment in association with the use of said test set, to cause said test set user interface to generate a detailed explanation of said message, and in response to a second operation of said input/output element, implementing a referential help database search subroutine.

12. An ISDN telecommunications device according to claim 11, wherein said ISDN telecommunications device comprises a portable ISDN test set.

13. An ISDN telecommunications device according to claim 11 wherein said user interface comprises a display element that is operative to display alpha-numeric messages associated with the operation of said ISDN telecommunications device.

14. An ISDN telecommunications device according to claim 11, wherein said ISDN telecommunications device comprises a portable ISDN test set, said user interface comprises a display element that is operative to display alpha-numeric messages associated with the operation of said ISDN test set, and wherein said input/output element comprises a manually operable switching element provided at a keypad region of said test set.

15. An ISDN telecommunications device according to claim 12 wherein said contextual-based alpha-numeric database includes a referential help database of alpha numeric terms/topics and their functional descriptions, that are associated with one or more of the architecture and operation of said test set, and conditions that may be encountered by said user when using the test set to test or communicate over said ISDN communication circuit.

16. An ISDN telecommunications device according to claim 12 wherein said supervisory control processor is operative, in response to operation of said input/output element when said test set user interface generates a 'cause' message, transmitted to said test set from telecommunication equipment in association with the termination of a call, to cause said test set user interface to present an explanation of said 'cause' message.

17. An ISDN telecommunications device according to claim 12, wherein said supervisory control processor is operative, in response to a first operation of said input/output element, when said test set user interface presents a message transmitted to the test set from telecommunication equipment in association with use of said test set, to execute a contextual-based assistance routine causes said test set user interface to present additional explanatory information, associated with the alpha-numeric contents of whatever is currently presented by way of said test set user interface.

18. An ISDN telecommunications device according to claim 12, wherein said supervisory control processor is operative, in response to a further operation of said input/output element, to cause said test set user interface to present an alpha-numeric message for accessing a referential help database of alpha numeric terms/topics and their functional descriptions, that are associated with one or more of the architecture and operation of said test set, and conditions that may be encountered by said user when using the test set to test or communicate over said ISDN communication circuit.

19. An ISDN telecommunications device according to claim 12, wherein said supervisory control processor is operative to cause said test set user interface to present an informational message that instructs the user to either begin scrolling through an alphabetized listing of topic/term definitions, or to press one of the alpha numeric keys on a test set keypad, that contains the letter which begins with the topic or term of interest.

20. An ISDN telecommunications device according to claim 12, wherein said supervisory control processor is operative, in response to the operation of a selected alpha-numeric key on said test set keypad one or more times, to cause said test set user interface to present a first alphabetical listing in a group of terms, each of which begins with a selected letter.

21. An ISDN telecommunications device according to claim 12, wherein said supervisory control processor is operative to cause said test set user interface to present a message instructing the user to depress a prescribed keypad to view a definition of a currently presented term.

* * * * *

UNITED STATES PATENT AND TRADEMARK OFFICE
CERTIFICATE OF CORRECTION

PATENT NO.     : 6,314,086 B1
DATED          : November 6, 2001
INVENTOR(S)    : Katz et al.

It is certified that error appears in the above-identified patent and that said Letters Patent is hereby corrected as shown below:

<u>Column 3,</u>
Lines 65-66, delete "help i.messages" substitute -- help messages --

Signed and Sealed this

Sixth Day of August, 2002

Attest:

Attesting Officer

JAMES E. ROGAN
*Director of the United States Patent and Trademark Office*